(12) United States Patent
Adamczyk et al.

(10) Patent No.: US 6,628,761 B1
(45) Date of Patent: Sep. 30, 2003

(54) METHODS AND SYSTEMS ALLOWING ACCESS TO A MESSAGING PLATFORM THROUGH A VISITED MESSAGING PLATFORM

(75) Inventors: Maria Adamczyk, Alpharetta, GA (US); James Carlton Bedingfield, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/476,681

(22) Filed: Dec. 30, 1999

Related U.S. Application Data

(60) Provisional application No. 60/121,945, filed on Feb. 26, 1999.

(51) Int. Cl.⁷ ................................................ H04M 1/64
(52) U.S. Cl. ................................ 379/88.19; 379/88.21; 379/88.22
(58) Field of Search .................... 379/88.18, 88.19, 379/88.21, 88.22, 67.1; 709/229, 226

(56) References Cited

U.S. PATENT DOCUMENTS

| | | | |
|---|---|---|---|
| 4,930,152 A | 5/1990 | Miller | |
| 4,933,967 A | 6/1990 | Lo et al. ................ | 379/88.22 |
| 5,058,152 A | 10/1991 | Solomon et al. | |
| 5,353,331 A | 10/1994 | Emery et al. | |
| 5,361,295 A | 11/1994 | Solomon et al. | |
| 5,425,091 A | 6/1995 | Josephs | |
| 5,493,607 A | 2/1996 | Arumainayagam et al. | |

(List continued on next page.)

FOREIGN PATENT DOCUMENTS

| | | |
|---|---|---|
| EP | 0 255 325 | 2/1988 |
| EP | 0 412 799 | 2/1991 |
| EP | 0 507 125 | 10/1992 |
| EP | 0 543 235 | 5/1993 |
| EP | 0 624 967 | 11/1994 |
| EP | 0 662 762 | 7/1995 |
| EP | 0782304 A2 | 7/1997 |
| EP | 0782315 A2 | 7/1997 |
| EP | 0782316 A2 | 7/1997 |
| EP | 0813162 A2 | 12/1997 |
| EP | 0825752 A2 | 2/1998 |
| EP | 0841796 A2 | 5/1998 |
| EP | 0843453 A2 | 5/1998 |
| EP | 0886228 A2 | 12/1998 |
| EP | 0841796 A3 | 8/1999 |
| WO | 97/08901 | 3/1997 |

OTHER PUBLICATIONS

"Die T–Net–Box– der Anrufbeantworter im Netz", XP–000861610, 1998.

"Voice Services on the Intelligent Network: Intelligent Peripherals and Service Nodes", F. Bosco, XP–000607359, Aug. 1992.

(List continued on next page.)

Primary Examiner—Ahmad F. Matar
Assistant Examiner—Karen Le
(74) Attorney, Agent, or Firm—Nora M. Tocups, Esq.

(57) ABSTRACT

Methods and systems to provide a particular subscriber of a messaging system with access to a selected messaging platform (SMP) by making a call to a pilot number from a line number other than a line number of the subscriber. The call is routed to the SSP serving the line number from which the call originated. Based on the use of the pilot number, the SSP receives instructions from an intelligent network element (INE) to route the call to a messaging platform serving the line number from which the call originated. If the messaging platform receives a backout indicator in the call, then the messaging platform provides a backout notice to the SSP. The SSP engages in an exchange with the INE so as to result in the SSP obtaining a selected number from the particular subscriber and providing the selected number to the INE. The selected number is used by the INE to obtain an address for the SMP. The INE then instructs the SSP to route the call to the address for the SMP.

28 Claims, 4 Drawing Sheets

U.S. PATENT DOCUMENTS

| | | |
|---|---|---|
| 5,521,969 A | 5/1996 | Paulus et al. |
| 5,572,583 A | 11/1996 | Wheeler, Jr. et al. |
| 5,680,442 A | 10/1997 | Bartholomew et al. .. 379/88.26 |
| 5,684,862 A | 11/1997 | Finnigan |
| 5,692,033 A | 11/1997 | Farris |
| 5,712,903 A | 1/1998 | Bartholomew et al. .. 379/88.25 |
| 5,717,742 A | 2/1998 | Hyde-Thomson |
| 5,740,230 A | 4/1998 | Vaudreuil |
| 5,740,231 A | 4/1998 | Cohn et al. |
| 5,742,763 A | 4/1998 | Jones |
| 5,742,769 A | 4/1998 | Lee et al. |
| 5,742,905 A | 4/1998 | Pepe et al. ................. 455/461 |
| 5,764,747 A | 6/1998 | Yue et al. |
| 5,768,348 A | 6/1998 | Solomon et al. |
| 5,790,637 A * | 8/1998 | Johnson et al. ........ 379/100.01 |
| 5,812,639 A | 9/1998 | Bartholomew et al. |
| 5,812,670 A | 9/1998 | Micali |
| 5,832,072 A | 11/1998 | Rozenblit |
| 5,832,221 A | 11/1998 | Jones |
| 5,838,768 A | 11/1998 | Sumar et al. ............ 379/88.14 |
| 5,848,132 A | 12/1998 | Morley et al. |
| 5,905,774 A | 5/1999 | Tatchell et al. |
| 5,930,479 A | 7/1999 | Hall |
| 5,940,478 A | 8/1999 | Vaudreuil et al. |
| 6,005,845 A | 12/1999 | Svennesson et al. |
| 6,064,723 A | 5/2000 | Cohn et al. |
| 6,148,069 A | 11/2000 | Ekstrom et al. |
| 6,169,795 B1 | 1/2001 | Dunn et al. |
| 6,209,100 B1 | 3/2001 | Robertson et al. |
| 6,226,359 B1 | 5/2001 | Montgomery et al. |
| 6,233,318 B1 * | 5/2001 | Picard et al. ............ 379/88.12 |
| 6,243,374 B1 | 6/2001 | White et al. |
| 6,301,349 B1 | 10/2001 | Malik |
| 6,317,484 B1 * | 11/2001 | McAllister ............. 379/201.02 |
| 6,330,079 B1 | 12/2001 | Dugan et al. |
| 6,339,640 B1 | 1/2002 | Chen et al. |

OTHER PUBLICATIONS

"The Belcore and ITU–T Call Model Operations", XP–002141946, 1998.

"Transactions in Intelligent Networks", XP–002141947, 1998.

"General Recommendations on Telephone Switching and Signalling—Introduction to Intelligent Network Capability Set 1", International Telecommunication Union, XP–002141945, Mar. 1993.

"An Enhanced Message Networking Topology: Multimedia Messaging with the Intuity™ Interchange Server," Bell Labs Technical Journal, Apr.–Jun. 1998, pp. 124–135.

* cited by examiner

| CALLING PARTY | DESTINATION ADDRESS PARAMETER |
|---|---|
| 3306666 | VMS 2 |
| 3302222 | VMS 1 |
| 3304444 | VMS 2 |

FIG. 4

METHODS AND SYSTEMS ALLOWING ACCESS TO A MESSAGING PLATFORM THROUGH A VISITED MESSAGING PLATFORM

RELATED APPLICATION

The present application claims priority to and the benefit of the prior filed copending and commonly owned provisional application entitled "Method and System for Transferring a Voice Mail Messaging Subscriber to a Different Voice Mailbox" filed in the United States Patent and Trademark Office on Feb. 26, 1999, assigned Application No. 60/121,945, and incorporated herein by reference.

FIELD OF THE INVENTION

The inventions relate to messaging methods and systems, and particular relate to methods and systems providing a subscriber of a messaging system with access to a messaging platform as selected by the subscriber.

BACKGROUND

A subscription to a messaging system provides a subscriber with a convenient way to send and receive communications. A messaging system may provide the subscriber with messaging services that allow the subscriber to send and receive communications such as voicemail messages, other messages such as data messages, and facsimile transmissions (faxes). The messaging services typically are provided to a subscriber through a messaging platform, which the subscriber may access through the use of an administrative number or pilot number. For example, a subscriber may use his or her telephone to dial the pilot number and access the messaging platform to retrieve, send, and/or forward messages, to makes changes to his or her preferences in receiving services, and for other reasons. A call to the pilot number may be referred to as a pilot call or an administrative call. The messaging platform serving the subscriber may be referred to as the subscription messaging platform. The subscriber's line number served by the subscription messaging platform may be referred to as the subscription line number.

As a messaging system gains subscribers or otherwise expands, the system may add messaging platforms and distribute its subscribers among the platforms for messaging services. One of the problems that arises with the use of a plurality of messaging platforms is the manner in which access to the platforms is to be provided to the subscribers. With one platform, a single pilot number may be distributed to all of the subscribers for access to the platform because all of the administrative calls are handled by the same platform. But with a plurality of platforms, each respective group of subscribers served by a platform of the system typically has its administrative calls handled by its platform. Thus, a different pilot number may need to be distributed for each different messaging platform in the system. For example, a subscriber who is served by messaging platform "A" uses pilot number "A" for his or her administrative calls; a subscriber who is served by messaging platform "B" uses pilot number "B" for his or her administrative calls; etc.

But the use of multiple pilot numbers within a messaging system poses several problems and is inconvenient for the subscribers. A subscriber may have to memorize more than one pilot number if he or she is served by more than one messaging platform. For example, a subscriber may subscribe to messaging services such that calls to the subscriber's home telephone number are served by messaging platform A, but calls to the subscriber's office are served by messaging platform B. The subscriber has to remember to use pilot number A to retrieve his or her home telephone messages, and has to remember to use pilot number B to retrieve his or her office messages.

Another inconvenience of multiple pilot numbers is suffered by a subscriber when he or she changes his or her messaging services so as to be served by a different messaging platform. For example, a subscriber may move from one side of a city to the other, and in the course of the move, change messaging platforms. In that example, the subscriber has to memorize a new pilot number in addition to all the other new or changed information the subscriber has to memorize or otherwise retain as a result of the move.

As a result of the inconvenience to service providers as well as subscribers of messaging systems in the use of multiple pilot numbers, some messaging systems having a plurality of messaging platforms have implemented the use of a single or common pilot number. In these common pilot number messaging systems, each subscriber dials the same pilot number to reach his or her respective messaging platform. But the subscribers do not all reach the same platform or element even though they are all using the same pilot number. Rather, a trigger, flag, or other indicator may be set in the service switching point (SSP) (also referred to herein as "switch") serving the subscriber's line number. As a result, a call from the subscriber's line number that is received in its serving switch is routed to the messaging platform that has been assigned to that line number of the subscriber. In other words, some translation may occur in the switch or be obtained by the switch to route the call to the appropriate messaging platform. Once the call reaches the appropriate messaging platform, the subscription line number is used by the messaging platform to access the mailbox or other storage corresponding to the subscriber associated with the subscription line number.

The common pilot number messaging system generally avoids the problems discussed above in connection with the use of multiple pilot numbers. But the common pilot number messaging system has its own problems. One problem relates to a subscriber who uses the common pilot number in making an administrative call to the messaging system, but is not connected to the messaging platform which he or she desires. This problem is referred to herein as the "unconnected subscriber problem". This problem may arise in a number of ways. For example, reference is made to the above-mentioned subscriber who subscribes to messaging services such that calls to the subscriber's home telephone number are served by messaging platform A, but calls to the subscriber's office are served by messaging platform B. Suppose this subscriber desires to retrieve messages made to his or her home telephone number while the subscriber is at his or her office. The subscriber dials the common pilot number, but the administrative call is connected to messaging platform B, which serves the subscriber's office number. The subscriber is able to retrieve his or her office messages from messaging platform B, but not his or her home messages. Those home messages are located on a different messaging platform (messaging platform A) and are accessed from a different (home) telephone number.

Another situation in which the unconnected subscriber problem may arise is where two subscribers subscribe to the same messaging system, but each subscriber is served by a different messaging platform. Unfortunately, the subscribers are unable to use each other's telephones to receive their respective messages. This situation is illustrated by reference to the characters and events in the Little Red Riding Hood fairy tale. Assume a first subscriber ("Red") is served by messaging platform A. Then assume Red's grandmother ("Granny") is served by messaging platform B. While visiting Granny's house, Red suspects that all is not well with Granny. Red decides to check her messages to see if any warning has been received from the friendly Woodcutter. But Red is unable to retrieve her messages from Granny's house. Red's call to the common pilot number on Granny's subscription number is directed to Granny's messaging platform. Thus, Red is unable to retrieve a warning (that a Wolf is posing as Granny) left on Red's messaging platform by the Woodcutter.

Accordingly, there is a need in a common pilot number messaging system for solutions to the unconnected subscriber problem. There is a need for methods and/or systems to allow a subscriber to call a pilot number from a line number other than his or her subscription line number and still be able to receive messaging services from his or her subscription messaging platform or from a selected messaging platform.

SUMMARY

Generally stated, the present inventions solve the unconnected subscriber problem of a pilot number messaging system. Exemplary methods and systems of the present inventions allow a subscriber to call a pilot number from a line number other than his or her subscription line number to receive messaging services from his or her subscription messaging platform or from a selected messaging platform.

An exemplary embodiment operates in a messaging system having functionally connected elements including two messaging platforms, a service switching point (SSP), and an intelligent network element (INE). The first of the two messaging platforms is designated as a particular messaging platform (PMP) of a particular subscriber. The PMP may be the subscription messaging platform providing the particular subscriber with messaging services. Alternatively, the PMP may be a messaging platform selected by the particular subscriber.

The second of the two messaging platforms serves a different subscriber who is served by the SSP so that calls made on a line number of the different subscriber to a pilot number are routed by the SSP to the second messaging platform.

For this example, assume the second messaging platform has been accessed by a call directed to a pilot number from the particular subscriber on the line number of the different subscriber. The pilot number may be a number common to all subscribers of the messaging system for making administrative or pilot calls to the messaging system. As a result of the call to the pilot number, the second messaging platform is designated as a visited messaging platform (VMP) with respect to the particular subscriber making the pilot call. This exemplary method allows the particular subscriber to access the PMP even though the particular subscriber made the call to the pilot number from the line number of the different subscriber served by the VMP.

Once connected to the VMP, the call is routed to the appropriate mailbox based on the line number of the different subscriber. An announcement of the identity or other information corresponding to the mailbox of the different subscriber may be made to the call. In addition, the announcement may include information on how to backout of the call such as by the caller providing an indicator for such backout. In this example, the particular subscriber, as the caller, provides an indicator such as a backout indicator with respect to the call at the VMP.

In response to receiving the indicator, the VMP provides a backout notice such as by sending a release message to the SSP serving the line number of the different subscriber. In response to the backout notice, the SSP obtains instructions with respect to the call from the INE. The instructions from the INE instruct the SSP to obtain a number from the particular subscriber. The particular subscriber may provide his or her subscription number as the number. Alternatively, the particular subscriber may provide another number as the number. The SSP obtains the number from the particular subscriber and provides the number to the INE.

In response to receiving the number, the INE determines which messaging platform serves the number as the PMP. The INE obtains an address of the PMP, and provides the SSP with further instructions including the address of the PMP. The further instructions may include a directive to the SSP to present the address of the SMP to the call. This presentation may be made by an announcement or by sending data for display on the equipment being used by the particular subscriber. In the alternative, or in addition, the further instructions may include a directive to use the address to route the call to the PMP as the subscription messaging platform (SMP). The SSP then follows the further instructions.

If the particular subscriber has only received a presentation of the address of the PMP, then the particular subscriber may take action to use the address to access the PMP. If the SSP has routed the call to the PMP, then the particular subscriber typically receives an announcement at the PMP with respect to the mailbox corresponding to the number the particular subscriber had provided. This announcement may identify the person or other entity associated with the mailbox the particular subscriber has reached. As before, this announcement may provide the particular subscriber with information on how to backout of the call. The particular subscriber may elect, once again, to exercise the option to backout of the call, and to have the call redirected to another network element.

Advantageously, the present inventions allow a subscriber to call a pilot number by using another subscriber's equipment so that the subscriber conveniently may access his or her own messaging platform (to retrieve messages, etc.) or to access a messaging platform as selected by the subscriber.

BRIEF DESCRIPTION OF THE DRAWINGS

FIG. 4 is a table of information used in exemplary method of FIG. 3.

DETAILED DESCRIPTION

The present inventions generally relate to embodiments that allow a subscriber to access a messaging platform serving a selected number even though the subscriber gains such access by a call to a pilot number from a line number served by a different messaging platform from the messaging platform serving the selected number.

Exemplary Environment for Exemplary Embodiments

The exemplary embodiments of the present inventions are used, preferably, with a region-wide messaging (RWM) system, as described in greater detail below. Nevertheless, the exemplary embodiments may be used with any type of messaging system with the appropriate functionality.

The region-wide messaging system described herein generally allows a subscriber to the messaging system within the region of the service provider to engage in messaging by sending, receiving, forwarding, and replying to messages, including voicemail messages, faxes, Internet data (including voice-over-Internet messages), and other electronic data.

Figure 1:
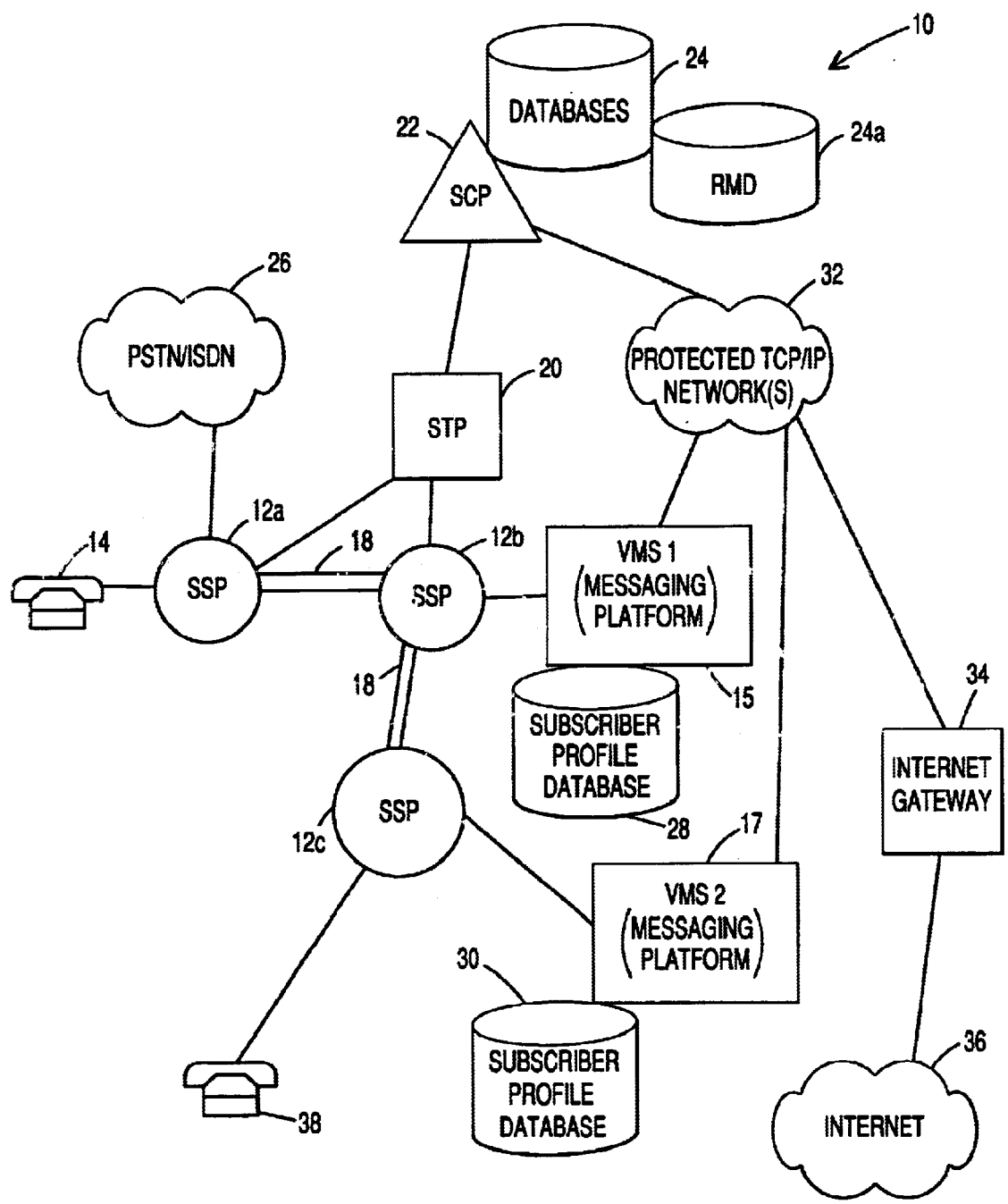
FIG. 1 is an exemplary environment wherein exemplary embodiments of the present inventions may be implemented and may operate.

Exemplary System—FIG. 1

FIG. 1 is a block diagram of an exemplary system 10 wherein exemplary embodiments of the present inventions may be implemented or operated. The system 10 includes a variety of interconnected network elements. A group of such elements includes the plurality of end offices, which are indicated as service switching points (SSPs or switches) 12a, 12b, 12c. An SSP typically includes switch functionality, but also includes other functionality so as to communicate with other network elements, and in particular, with Advanced Intelligent Network (AIN) elements. SSP 12a and SSP 12c are each coupled to a subscriber line, which also may be referred to as a line or calling line. Each SSP 12a, 12b, 12c serves a designated group of lines, and thus, the SSP that serves a particular line may be referred to as its serving switch. The line is typically connected to a piece of terminating equipment including a telephone 14. Although a telephone 14 is illustrated as the terminating equipment, such terminating equipment may include other telecommunication devices including facsimile machines, computers, modems, etc. End offices may further be coupled through a tandem office (not illustrated), which may be used to connect and switch circuits between and among end offices.

Each active line in an AIN is assigned a ten digit (NPA-NXX-XX XX) line number regardless of whether seven or ten digits are dialed to reach the subscriber. A line number is commonly referred to as a number, telephone number, destination number, or a directory number. A line number of a subscriber may be referred to as a subscription line number.

SSP 12b is connected by trunks (Signaling System 7 (SS7)) to a voice mail system (VMS1) 15. (These trunks use SS7 signals for call set-up and other actions and are referred to as SS7 trunks.) SSP 12c is connected by SS7 trunks to a voice mail system (VMS2) 17. A voice mail system (VMS) also may be referred to as a messaging platform (MP).

SSPs 12a, 12b, 12c are interconnected by a plurality of trunk circuits 18. These are the voice path trunks that interconnect the SSPs to connect communications. Each of the SSPs may be connected to another type of AIN element referred to as a local signal transfer point (STP) 20 via respective data links. Currently, these data links employ a signaling protocol referred to as Signaling System 7 (SS7). Much of the intelligence of the AIN resides in yet another type of element referred to as a service control point (SCP) 22 that is connected to STP 20 over an SS7 data link. Among the functions performed by the SCP 22 is the maintenance of network databases and subscriber databases as represented collectively by databases 24.

In order to keep the processing of data and calls as simple as possible, a relatively small set of triggers is defined at the SSPs for each call. A trigger in the AIN is an event associated with a particular call that generates a packet to be sent to an SCP. The SCP queries its databases or service package applications (SPAs) for processing instructions with respect to the particular call. The results are sent back to the SSP in response from the SCP 22 through STP 20. The return packet includes instructions to the SSP on how to process the call. The instructions may be to take some special action as a result of a customized calling service or an enhanced feature. In response to the instructions, the SSP moves through the remaining call states, may encounter further triggers, and generates further packets that are used to set up and route the call. Similar devices for routing calls among various local exchange carriers are provided by regional STP (not illustrated) and by regional SCP (not illustrated) which may be connected to STP 20, SCP 22, and/or to the elements described herein through the public switched telephone network (PSTN) 26.

When a subscriber (such as the person or entity using telephone 14) subscribes to messaging service, an entry including profile data relating to the subscriber is created in a VMS such as VMS 15 or 17. The VMS or messaging platform including a subscriber's profile data also provides the messaging services to the subscriber. Thus, a VMS that serves a subscriber may be referred to as a subscription messaging platform (SMP). Each VMS 15, 17 includes or is functionally connected to a subscriber profile database 28, 30. Each subscriber profile database stores subscriber-specific profile data for retrieval by VMS functions.

While the specific details of the VMS 15, 17 are vendor-specific, the VMS preferably has several capabilities. Each VMS 15, 17 includes subscriber administration, message retrieval, send, reply, forward, and mailbox maintenance functions, among others. Each VMS 15, 17 also has certain interface capabilities, including the ability to originate and terminate SS7 calls. In addition, the VMS 15, 17 have TCAP messaging ability.

Of course, the VMS 15, 17 are elements of the messaging system 10. To the protected TCP/IP network(s) 32 described below, the messaging platforms look like valid electronic (e-mail) destinations. In support of this, each VMS 15, 17 may be assigned a TCP/IP (or IP) address and/or a domain name. Generally, the IP or other address or domain name of the VMS 15, 17 may be stored in a region-wide messaging directory (RMD) 24a, or may be stored on some domain name service (not illustrated) in the protected TCP/IP network(s) 32, or some other element. In further support of this TCP/IP capability, the VMS 15, 17 may also provide operations access to, two standard Internet mail administrative destinations, in addition to subscriber messaging mailbox destination. These destinations may include: "postmaster@mp 168.mps.com" and "non-mailuser@mp 168.msp.com" (where "mp 168.mps.com" in these destinations is the address of the VMS). In addition, each VMS is an SS7 network element and as such is assigned a point code such as a destination point code (DPC).

The VMS 15, 17 communicate with the SSP and the SCP according to the AIN 0.2 Switch—Intelligent Peripheral Interface Generic Requirements—1129-CORE Specification, AINGR: Switch-Intelligent Peripheral Interface (IPI)(A module of AINGR, FR-15); Document Number: GR-1129; Issue Number: 03; Updates: REV 01—October 1997; Issue Date: September 1997; Product Type: Industry Requirements and Standards (RS); Component of FR-15, which is incorporated herein by reference. This 1129 Spec describes the use of a Remote Operations parameter for indicating the invocation of a supplementary service. The service is identified by an operation value. The Remote Operations Parameter may be used to allow the SCP and the VMS to share information regarding a subscriber to the messaging system.

In this messaging system, Internet messaging is allowed via a private Transmission Control Protocol/Internet Protocol (TCP/IP) network (protected TCP/IP network(s)) 32. The VMS 15, 17 through the network 32 routes Lightweight Directory Access Protocol (LDAP) queries and responses to the proper destination/recipient. The routing scheme may be based on a combination of the area code (NPA), other elements of a directory number, and/or the service provider. For example, a VMS may send an LDAP query to the SCP with a destination address of 404@rwm-.bellsouth.com. A domain name server (not illustrated) (DNS or domain server) associated with the TCP/IP network 32 routes the LDAP query to the SCP 22 including a messaging directory 24a associated or included in the SCP 22 for processing and returns a response. The TCP/IP network 32, using addresses from an LDAP query, transports Voice Profile for Internet Mail (VPIM) encoded messages between VMS 15, 17 and other VMS within the network 10. The LDAP query is used to determine routing for a message.

An Internet gateway 34 provides secure access between the private TCP/IP network 32 and the Internet 36. The gateway 34 limits the access of VPIM traffic to and from the Internet 36. In addition, the gateway 34 performs authorized LDAP messaging directory lookups to route messages received from the Internet 36.

Region-Wide Messaging Directory (RMD)

The SCP 22 is coupled to or includes one or more databases 24 and a Region-Wide Messaging Directory (RMD) 24a. The RMD provides high-speed directory lookup for messaging subscribers. Generally, an RMD stores information referred to as profile data so as to determine which messaging platform of the system serves which subscriber, which mailbox, etc. Additional information on the manner in which the RMD of the messaging system 10 stores information on messaging platforms and subscribers and how an RMD interacts with network elements is provided in the commonly owned patent application entitled "Methods and Systems for Determining Messaging Routing Based on Elements of a Directory Number," filed in the United States Patent and Trademark Office on Dec. 13, 1999, assigned Ser. No. 09/459,498, and incorporated herein by reference.

The RMD includes an interface for the Light-Weight Directory Access Protocol (LDAP). The RMD may act as both a client and a server with respect to LDAP. Particularly, the RMD acts as an LDAP server in responses to queries for subscriber profile data (also referred to as profile data) from clients. The queries typically are LDAP v.2 formatted queries. The RMD stores the subscriber profile data which may include subscriber, service, and other messaging data. LDAP clients may retrieve the profile data relating to a particular subscriber or number from the RMD. In addition, the RMD supports the LDAP attributes field for LDAP clients to choose the fields that they desire to retrieve from the server. Each VMS has a unique domain name associated with it. The RMD stores the domain name of the subscriber's VMS in the service data of the subscriber's profile data.

Subscriber data may be stored in the RMD in the following exemplary fashion:

| Description/Directory Field | LDAP DN Attribute |
|---|---|
| Subscriber's Mailbox Number | CN (Common Name) |
| Name Announcement | Spoken Name |
| MDSBlocking | N/A |

Subscriber data is used to look up subscribers in the RMD. The data is also used for the purposes of routing and billing subscriber calls to and from the messaging platforms.

Service data may be stored in the RMD as follows:

| Description/Directory Field | LDAP DN Attribute |
|---|---|
| VMS ID | VMSID |
| VMS DAP Number | VMSDN |
| VMS Domain | Domain |
| VoiceEncoding | N/A |
| LATA | N/A |
| State | N/A |
| StateLATA | N/A |
| LDAP Credentials | Included in LDAP query |
| VMS IP address | Included in LDAP query |

The service data contains messaging platform-specific information to perform certain checks during directory lookup and call routing. The RMD may also store service provider data to ensure that a service provider has access to only its authorized subscribers' information.

Exemplary Methods

Figure 2:
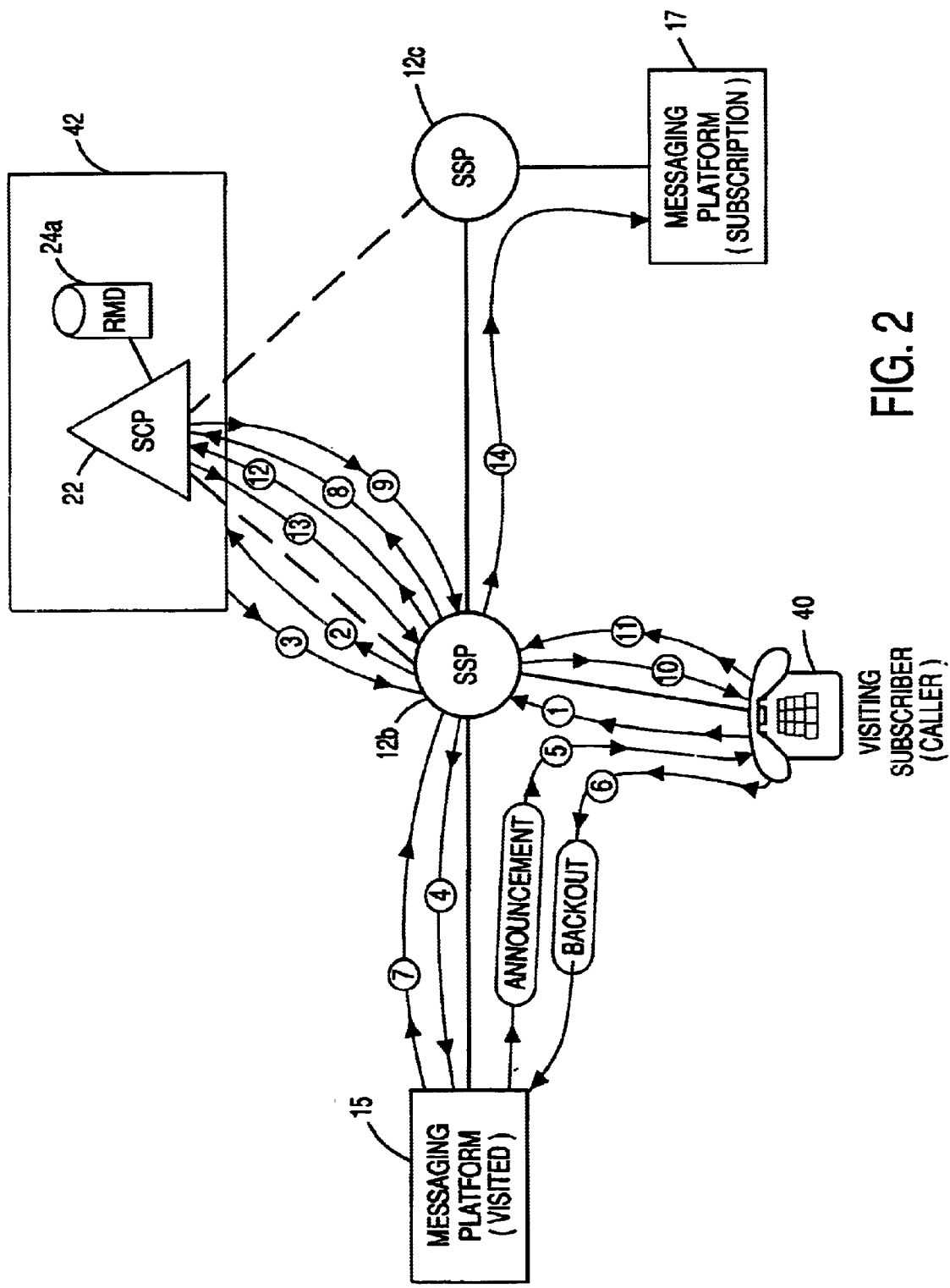
FIG. 2 is a flow diagram illustrating an exemplary method of the present inventions.

FIG. 2 illustrates the actions of an exemplary method in block diagram form using arrows to illustrate the actions among the pertinent elements of the system 10. FIG. 2 presents the relevant elements of the system 10 from FIG. 1, but in simplified format for ease of explanation. In particular, this block diagram illustrates an exemplary method for VMS 15 to interact through SSP 12b with an intelligent network element (INE) 42 (including or composed of elements such as an SCP 22 and/or RMD 24a), and another messaging platform 17. The interaction takes places in a messaging system 10 to allow a visiting subscriber 40 to access a selected messaging platform (SMP) 17 serving a selected number by placing a call to a pilot number on equipment having a line with a line number that is different from the selected number. The line number is served by a messaging platform ("visited messaging platform" or "VMP") 15 different from the selected messaging platform (SMP) 17.

The terms "visited", "visiting", "selected", "particular", "home", and "subscription" are used herein to ease explanation of the subject matter. But the subscriber does not have to be a "visitor" to another platform. For example, the subscriber may have a "home messaging platform" for his or her home messages, and an "office messaging platform" for his or her office messages. In this example, either the home or office messaging platform may be the "visited" or "subscription" platform depending on whether the subscriber is using his or her home equipment to obtain office messages or vice versa.

Moreover, a subscriber may select access to a messaging platform other than his or her home or subscription messaging platform. For example, a father and his daughter may both subscribe to messaging services, but be served by respective messaging platforms. In this example, assume father has asked his daughter to check his messages while father is out of the country. Daughter may find it more convenient to check her father's messages from a girlfriend's house than from her own or her father's home telephones. Pursuant to the present inventions, daughter may call the common pilot number, provide a backout indicator, provide her father's number as a "selected number", and then be provided with access to the messaging platform serving her father's number.

In addition, in some cases, a mailbox number of a subscriber may not be the same as the line number of the subscriber. Thus, the number provided by the subscriber to access the appropriate messaging platform, may be a mailbox number or identity number other than a line number.

To illustrate the exemplary method, referring to FIG. 2, assume a particular subscriber 40 is visiting a location of a different subscriber of the messaging system 10. The different subscriber is served by a messaging platform 15, which is different from that of the visiting subscriber 40, who is served by the home or subscription messaging platform (SMP) 17. Nevertheless, the visiting subscriber 40 desires to retrieve his or her messages from the SMP 17. The visiting subscriber 40 places an administrative or pilot call using the equipment of the different subscriber. This equipment is connected to a line having a line number that is served by SSP 12b. The SSP 12b is provisioned to route and/or to obtain instructions from an intelligent network element (INE) 42 to route the call to the VMP 15. Thus, the call to the pilot number initially is directed from the visiting subscriber 40 to SSP 12b. See arrow 1. The SSP 12b obtains instructions from the INE 42 to route the call to the VMP 15. See arrows 2 and 3. The SSP 12b follows the instructions. See arrow 4.

Advantageously, this exemplary embodiment responds to receipt of the call to the pilot number by providing the caller with an announcement. See arrow 5. The announcement may provide the caller with information on the mailbox the caller has reached on the messaging platform 15. In particular, once the call is routed to the VMP 15, the line number on which the call to the pilot number is made is used to look up the corresponding mailbox (or other storage mechanism) to the line number. In other words, VMP 15 uses the line number to look up the visited subscriber's mailbox, and connects the call to the mailbox. Once connected, an announcement may be made to the caller as to the identity of the subscriber corresponding to the mailbox. If the visited subscriber is named "Navneet", then the announcement may state or otherwise present: "You have reached the mailbox of Navneet."

In addition to the identity announcement, the exemplary embodiment provides the caller with further information such as the option to backout of the call. Generally, a "backout" of a call is to have the call redirected away from the network element to which the call has been directed. In some cases, this redirection may mean that the network element to which the call has been directed "releases" the call, so that the call is redirected to another network element such as the element which originally directed the call to the network element. To provide information about the backout option, an exemplary announcement, after the identity presentation, may state or otherwise present: "If this is not the mailbox you intended to reach, then please press '*'." The pressing of the "*" touch-tone keypad of a telecommunications unit serves as an indicator that the caller desires to backout of the call. Effectively, the visiting subscriber 40 is presented with an opportunity to "backout" of interaction with the VMP 15 and to access a different messaging platform.

Alternatively, to exercise the option, the announcement may present the visiting subscriber with differing instructions to respond with a backout or other indicator. The indicator may be any signal from the caller that provides an indication to exercise the option of backing out of the call. As yet another alternative, once the call reaches the VMP 15, the caller may provide a backout indicator without any prompting or announcement from the VMP 15. In this example, the caller provides the backout indicator in the call that is routed from the visiting subscriber 40 through SSP 12b to the VMP 15. See arrow 6.

The VMP 15 receives the backout indicator, and in response, provides a backout notice that is routed through the SSP 12b to the INE 42. See arrows 7 and 8. The backout notice may be the same as the backout indicator. Alternatively, the backout notice may be some code that informs the elements of the messaging system that the call is to be released from VMP 15. As a result of the release, the call may be transferred to another network element such as a messaging platform other than the VMP 15. At this point, the VMP 15 may be released or drop out of the call path, so that the call is connected from the equipment of the different subscriber to the SSP 12b, but not to the VMP 15.

The backout notice provides notice to the INE 42 that the caller desires to access a messaging platform other than VMP 15. For example, the caller desires to access his or her SMP 17. To provide instructions on routing of the call, the INE 42 requires information in the form of the visiting subscriber's line number ("subscription number") or other identification such as mailbox or identity number. The INE 42 directs the SSP 12b to obtain the number. See arrow 9. The SSP 12b follows the directive by making a request to the caller for the number. See arrow 10. In response, the caller provides the number. See arrow 11. In turn, the SSP 12b provides the number to the INE 42. See arrow 12.

In response to receiving the number, the INE 42 determines which messaging platform serves the number. The INE 42 then obtains an address such as the address of the SMP 17 and provides the SSP 12b with further instructions including the address of the SMP 17. See arrow 13. These further directions may include a directive to use the address to route the call to the SMP 17. Alternatively, these further instructions may direct the SSP 12b to present the address of the SMP 17 to the call. For example, the address may be the directory number of the SMP 17. After the directory number of the SMP 17 has been presented by the SSP 12b to the caller, then the caller may call the SMP 17 himself or herself.

As yet another alternative, the further instructions may direct the SSP 12b to further route the call to the SMP 17 and to present the address of the SMP 17 to the caller. Additional or alternative information may be presented to the caller with respect to the address of the SMP 17 so that the caller may make use of the address of the SMP 17 to retrieve messages, redirect messages, etc.

In response to receiving the further instructions, in the example of FIG. 2, the SSP 12b routes the call so that it is transmitted through SSP 12c to VMP 17. See arrow 14.

Advantageously, this exemplary method provides the particular subscriber ultimately with access to his or her SMP 17 even though the particular subscriber used the pilot number to make the call on the line number of the different subscriber resulting in the call being initially routed to the VMP 15 before being routed ultimately to the SMP 17.

In the example of FIG. 2, the visiting subscriber made a call to a pilot number, and this pilot number is commonly used by all subscribers of the messaging system 10 desiring to make an administrative call. Nonetheless, the exemplary embodiments may be made to operate with a messaging system that does not use a common pilot number. Assume for example, the visiting subscriber 40 is provided with a pilot number for his or her administrative calls, and the subscriber ("Navneet") whose equipment the visiting subscriber 40 is using is provided with a pilot number. The visiting subscriber 40 may obtain the different pilot number from Navneet to make an administrative call from Navneet's equipment. The visiting subscriber may exercise the backout option in generally the same manner using Navneet's pilot number (rather than his or her own pilot number) so as to access the subscription messaging platform of the visiting subscriber.

Figure 3:
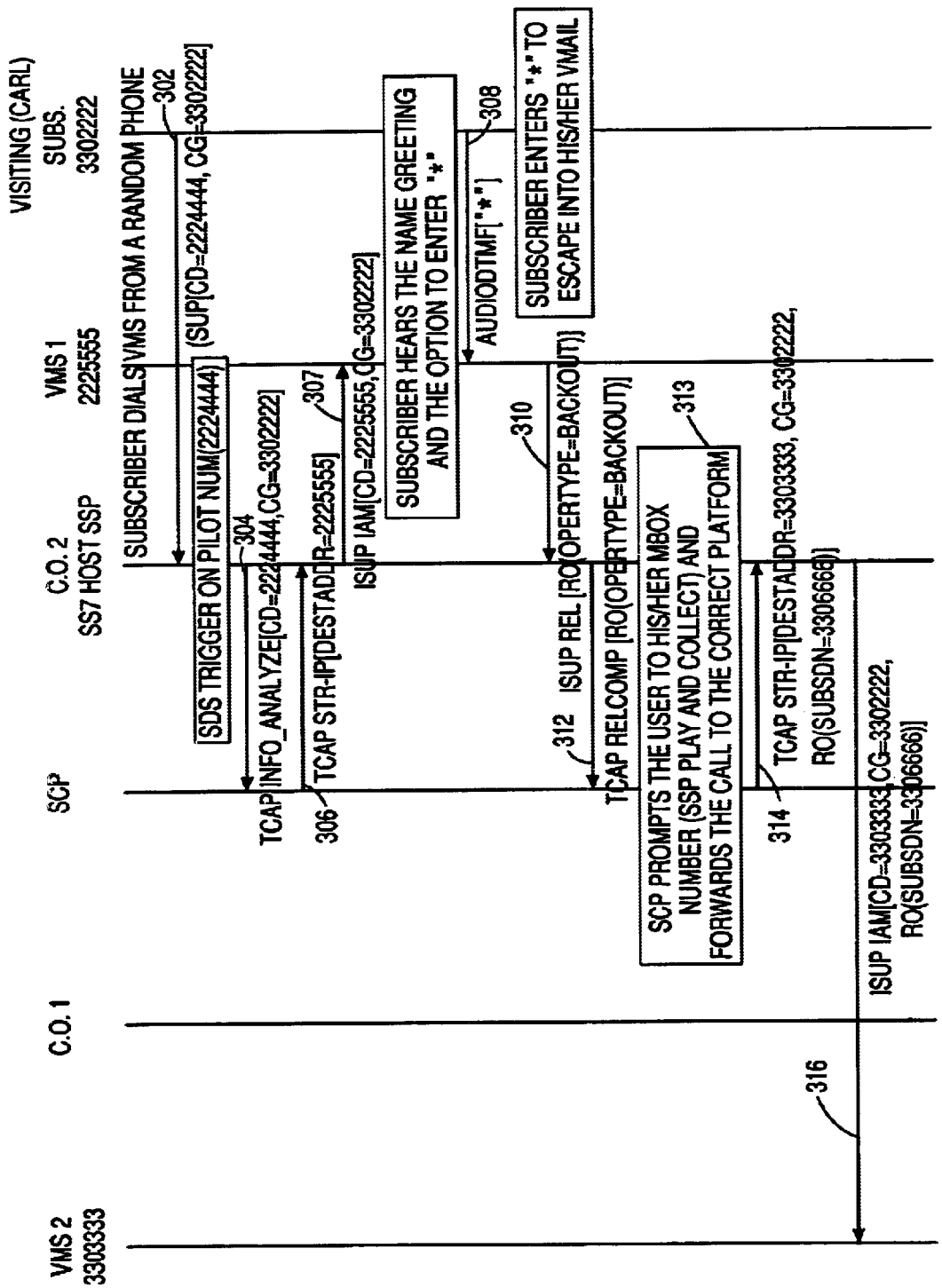
FIG. 3 is a timing diagram illustrating an exemplary method of the present inventions.

FIG. 3 is a timing diagram or call flow illustrating another exemplary method of the present inventions. A visiting subscriber ("Carl") makes a pilot call to a messaging platform for the retrieval of messages. In this example, Carl is using the equipment of another subscriber ("Navneet"). The equipment is connected to a line having a directory number (DN) (line number) of 3302222. Referring to FIG. 3, in action 302, Carl dials the pilot number of 2224444. The resulting Integrated Services Digital Network User Part (ISUP) message includes the call destination as the pilot number and the line number as the number of Navneet.

The call encounters a specific digits string ("SDS") trigger provisioned with respect to the pilot number on the SSP serving the line number on which the call is made. The SDS trigger causes the SSP, in action 304, to launch a query to an INE such as an SCP. The query is a transactional capabilities application part (TCAP) Info_Analyzed query, which includes the called number (i.e., the pilot number) and the calling number (Navneet's directory number).

The INE, in response to the query, accesses a table (or other information compilation) in its subscriber database (and/or in a directory such as the RMD), to determine the appropriate destination for the call. The INE recognizes the call as a call to a messaging platform based on the use of the pilot number as the called number. The INE uses the calling number to determine the address of the appropriate messaging platform to which the call is to be routed.

FIG. 4 illustrates an exemplary SCP table 400 as may be used to determine the address of the appropriate messaging platform. The SCP table 400 includes two columns of information: (1) a calling party column 410; and (2) a destination address parameter ("DAP") column 420. DAP may be a directory number, a point code, or even an internet protocol (IP) address. The information in the entries that span the columns is coordinated. The DAP column 420 stores a directory number used in office translations to identify the SS7 trunks terminating to the messaging platform for the corresponding subscriber, mailbox, or other number. Pursuant to the example described in FIG. 3, the calling number is 3302222, which corresponds to a DAP of VMS 1 (i.e., the address is that of VMS 1).

Referring again to FIG. 3, in action 306 the INE includes the address of the VMS of Navneet in a response to the SSP's query that directs the SSP to route the call to VMS of Navneet. The response from the INE is an TCAP-STR-IP [DestAddr=2225555] message. (STR=send to resource; IP=intelligent peripheral; and DestAddr=destination address). In action 307, the SSP routes the call to the VMS of Navneet and sends along the calling number and the messaging platform number or address (the DAP received from the SCP). The SSP uses an ISUP IAM message having a call destination of 2225555 (the VMS of Navneet) and a calling line number of 3302222 (Navneet's line number).

The VMS of Navneet uses the calling number to access the mailbox of Navneet. The VMS of Navneet is programmed to play a greeting to the caller (in this example, Carl). The greeting indicates the name assigned to the accessed mailbox. For example: "You have reached the mailbox of Navneet." The greeting also provides information to Carl on how to exercise backout of the mailbox by pressing a key such as "*".

In action 308, Carl elects to backout of the mailbox of Navneet by providing the appropriate indication. The VMS of Navneet collects the audio digits (such as "*") from the caller. In response to the backout indication, in action 310, the VMS of Navneet sends an 1129 encoded message to the SSP serving the line number of Navneet. The RO parameter of the message is modified to include an operation type, which may be defined as "backout notice" or "administrative backout", or similar identifier. The message is an ISUP REL [RO(OperType-Backout)] message. (REL=release; RO=remote operations). The use of the operation type in the RO parameter of the message is notice that the caller desires to backout of the call as routed to the VMS1, and perhaps to access a different mailbox, and/or an altogether different messaging platform.

In response to receipt of the message from the VMS of Navneet, the SSP engages in a query/response exchange with the SCP by transmitting a message to the SCP. As before, the message includes the modified RO parameter identifying the call as an administrative backout call. The message is a TCAP release complete RelComp [RO (OperType=Backout)] message. In action 313, the SCP provides the SSP with a "play-and-collect" message which instructs the SSP to play an announcement to the caller to obtain the caller's mailbox number, which typically is the subscriber number, or to obtain any other selected number provided by the caller. The SSP follows the instructions, collects the digits from the Carl, and forwards the digits to the SCP.

Next, the SCP searches the appropriate information source such as a database, table, and/or the directory (RMD) to determine the DAP for the messaging platform serving the number provided by the caller. For example, the SCP may search the aforementioned SCP table 400 illustrated in FIG. 4. Once the SCP obtains the DAP for the messaging platform serving the number provided by the caller, the SCP, in action 314, provides the SSP with an 1129 message. This message includes the collected digits in the RO parameter. This is a TCAP STR-IP[DestAddr=3303333, Cg=3302222, RO(SubsDN=3306666)] message. Alternatively, the SCP may place the collected digits in the calling number parameter. By this message, the SCP instructs the SSP to route the call to the messaging platform serving the number as provided by Carl.

In action 316, the SSP then routes the call to the message platform of Carl (VMS2). This routing includes an ISUP IAM[Cd=3303333, CG=3302222,RO(SubsDN=3306666)] message. Upon connection, the messaging platform (VMS2) uses the number provided by Carl to determine which mailbox on the platform to access. Once the mailbox has been accessed, the caller may hear an announcement as to the identity associated with the mailbox such as "You have reached the mailbox of Carl". This greeting provides Carl with assurance that he has reached the mailbox desired. On the other hand, this mailbox may not be or may no longer be the mailbox desired to be accessed by Carl. In that case, Carl may repeat the process of backing out of this call and having it redirected to a messaging platform serving a number as provided by Carl. The repeat of the backing out may follow generally the same actions as followed in the backout of Carl's call from Navneet's messaging platform to Carl's messaging platform. Advantageously, Carl uses a pilot number for an administrative call to the messaging system, and Carl is able to select which messaging platform to be connected to for retrieval of messages or other functions.

Given the foregoing disclosure of the exemplary embodiments of the present inventions, other embodiments will suggest themselves to those skilled in the art. Therefore, the scope of the present inventions is to be limited only by the claims below.

What is claimed is:

1. In a messaging system having functionally connected elements including two messaging platforms, a service switching point (SSP), and an intelligent network element (INE), wherein a first of the two messaging platforms is designated as a particular messaging platform (PMP) of a particular subscriber, wherein a second of the two messaging platforms serves a different subscriber who is served by the SSP so that calls made on a line number of the different subscriber to a pilot number are routed by the SSP to the second messaging platform, wherein the second messaging platform has been accessed by a call directed to the pilot number from the particular subscriber on the line number of the different subscriber, and as a result, the second messaging platform has been designated as a visited messaging platform (VMP) with respect to the particular subscriber, a method to allow the particular subscriber to access the PMP even though the particular subscriber made the call to the pilot number from the line number of the different subscriber served by the VMP, the method comprising:

receiving an indicator with respect to the call at the VMP, the indicator indicating a desire by the particular subscriber to backout of the call;

in response to receiving the indicator, causing the VMP to provide a backout notice;

in response to the backout notice, causing the SSP to obtain instructions from the INE, the instructions instructing the SSP to obtain a number from the particular subscriber;

in response to the instructions, causing the SSP to obtain the number from the particular subscriber and to provide the number to the INE; and in response to receiving the number, causing the INE to determine which messaging platform serves the number as the PMP, to obtain an address of the PMP, and to provide the SSP with further instructions comprising the address of the PMP.

2. The method of claim 1, wherein the indicator further indicates a desire by the particular subscriber to be connected to the PMP.

3. The method of claim 1, wherein the PMP comprises a subscription messaging platform (SMP) providing the particular subscriber with messaging services.

4. The method of claim 3, wherein the number comprises a subscription number.

5. The method of claim 1, wherein the further instructions comprise a directive to use the address to route the call to the SMP; and further comprising:

in response to receiving the further instructions, causing the call to be routed based on the address to the SMP.

6. The method of claim 1, wherein the further instructions comprise a directive to the SSP to present the address of the SMP to the call; and further comprising:

in response to receiving the further instructions, causing the SSP to present the address of the SMP to the call.

7. The method of claim 1, wherein the pilot number comprises a number common to all subscribers of the messaging system for making administrative or pilot calls to the messaging system.

8. A method to provide a particular subscriber of a messaging system with access to a selected messaging platform (SMP) by making a call to a pilot number from a line number other than a particular line number of the subscriber, the method comprising:

in response to receiving the call to the pilot number on the line number, the line number being other than the particular line number of the subscriber, causing an SSP serving the line number to route the call to a messaging platform of the messaging system;

if the messaging platform receives a backout indicator in the call, then causing the messaging platform to provide a backout notice;

based on the backout notice, causing the SSP to engage in an exchange with an intelligent network element (INE) so as to result in the SSP obtaining a selected number from the particular subscriber and providing the selected number to the INE;

using the selected number, causing the INE to obtain an address for the SMP of the particular subscriber and to provide the address to the SSP; and in response to receiving the address, causing the SSP to route the call to the address of the SMP and/or to present the address to the particular subscriber.

9. The method of claim 8, further comprising, in response to the routing of the call to the messaging platform, causing the messaging platform to provide the particular subscriber with an announcement.

10. The method of claim 9, wherein the announcement comprises information about an option available to the particular subscriber to backout of the call by providing the backout indicator.

11. The method of claim 8, wherein the selected messaging platform comprises a subscription messaging platform of the particular subscriber.

12. The method of claim 11, wherein the selected number comprises the subscription number of the particular subscriber.

13. The method of claim 8, wherein the pilot number comprises a number common to all subscribers of the messaging system for making administrative or pilot calls to the messaging system.

14. A method to provide a particular subscriber of a messaging system with access to a selected messaging platform (SMP) by making a call to a pilot number from a line number other than a particular line number of the subscriber, comprising:

in response to receiving the call, routing the call to a messaging platform of the messaging system;

after routing the call, receiving a backout notice from the messaging platform;

in response to receipt of the backout notice, participating in communications with an intelligent network element (INE) so as to result in obtaining a selected number from the particular subscriber, providing the selected number to the INE, and obtaining from the INE an address for the SMP of the particular subscriber; and in response to receiving the address, routing the call to the address of the SMP or presenting the address of the SMP to the call.

15. The method of claim 14, wherein the messaging platform comprises a visited messaging platform (VMP) serving the line number used by the particular subscriber to make the call to the pilot number.

16. The method of claim 14, wherein the selected messaging platform comprises a subscription messaging platform of the particular subscriber.

17. The method of claim 16, wherein the selected number comprises the subscription number of the particular subscriber.

18. The method of claim 14, wherein the pilot number comprises a number common to all subscribers of the messaging system for making administrative or pilot calls to the messaging system.

19. A method to provide a particular subscriber of a messaging system with access to a selected messaging platform (SMP) by allowing the particular subscriber to make a call to a pilot number from a line number other than a particular line number of the subscriber, comprising:

in response to the call, causing the call to be routed to a messaging platform of the messaging system;

in response to receipt of a backout indicator relating to the call, causing a selected number to be obtained from the call so the selected number may be used to determine an address for the SMP; and causing the address to be used to route the call to the selected messaging platform or to be presented to the particular subscriber.

20. The method of claim 19, wherein the messaging platform comprises a visited messaging platform (VMP) serving the line number of the particular subscriber used to make the call to the pilot number.

21. The method of claim 19, wherein the pilot number comprises a number common to all subscribers of the messaging system for making administrative or pilot calls to the messaging system.

22. A messaging system that allows a particular subscriber to access a messaging platform by allowing the particular subscriber to make a call to a pilot number from a line number other than a particular number of the subscriber, comprising:

a service switching point (SSP) adapted to engage in query/response exchanges with a service control point (SCP) to provide the SCP with call information with respect to a call that is made from a line number served by the SSP and that is made to a pilot number, the call information comprising
the line number the call is made from,
a backout notice received in the call, and
a selected number provided in association with the call;

the SCP having data on which messaging platform serves which numbers in the messaging system, and the SCP adapted to use the data to engage in the query/response exchanges with the SSP to provide the SSP with further instructions for the call, the further instructions comprising
a directive, based on the call being made to the pilot number, to route the call to an associated messaging platform, and
an instruction, based on the call providing a backout indicator to the associated messaging platform and the selected number to the SSP, either (1) to further route the call to a messaging platform other than the associated messaging platform, or (2) to present the call with further information; and the associated messaging platform adapted to receive the call, and to provide the backout notice when the backout indicator is received from the call.

23. The messaging system of claim 22, the further instructions comprising an address for another messaging platform.

24. The messaging system of claim 22, the further information comprising an address for another messaging platform.

25. The messaging system of claim 22, wherein the associated messaging platform serves the line number served by the SSP.

26. The messaging system of claim 22, wherein the messaging platform other than the associated messaging platform comprises a subscription messaging platform of the particular subscriber.

27. The messaging system of claim 26, wherein the selected number comprises the subscription number of the particular subscriber.

28. The messaging system of claim 22, wherein the pilot number comprises a number common to all subscribers of the messaging system for making administrative or pilot calls to the messaging system.

* * * * *